United States Patent [19]
Nishimura et al.

[11] Patent Number: 5,267,111
[45] Date of Patent: Nov. 30, 1993

[54] VOICE COIL MOTOR WITH DISCRETE FLUX PATHS

[75] Inventors: Yuji Nishimura; Tsuyoshi Takahashi, both of Odawara; Masahiko Sega, Hiratsuka; Jyousei Shimizu, Odawara; Tomio Suzuki, Hiratsuka, all of Japan

[73] Assignee: Hitachi, Ltd., Tokyo, Japan

[21] Appl. No.: 790,680

[22] Filed: Nov. 8, 1991

[30] Foreign Application Priority Data

Nov. 16, 1990 [JP] Japan .................................. 2-312272

[51] Int. Cl.$^5$ .......................... G11B 21/22; G11B 5/55
[52] U.S. Cl. ...................................... 360/106; 310/13
[58] Field of Search .................... 360/106, 104; 310/13

[56] References Cited

U.S. PATENT DOCUMENTS 4,812,934 3/1989 Suzuki et al. ...................... 360/106

FOREIGN PATENT DOCUMENTS 58211363 6/1982 Japan .
6310379 7/1986 Japan .
1177854 12/1987 Japan .

Primary Examiner—John H. Wolff
Attorney, Agent, or Firm—Meltzer, Lippe, Goldstein et al.

[57] ABSTRACT

In a voice coil motor having a voice coil, and a magnetic circuit which generates a magnetic flux traversing the voice coil; the magnetic circuit includes a yoke which is divided so as to form a plurality of magnetic paths traversing the voice coil and which is provided with hollows, and adjustment members which are inserted into the hollows so as to adjust the magnetic fluxes of the magnetic paths independently of one another.

10 Claims, 4 Drawing Sheets

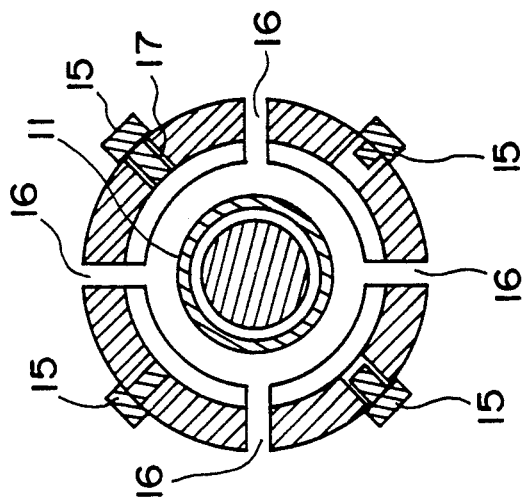
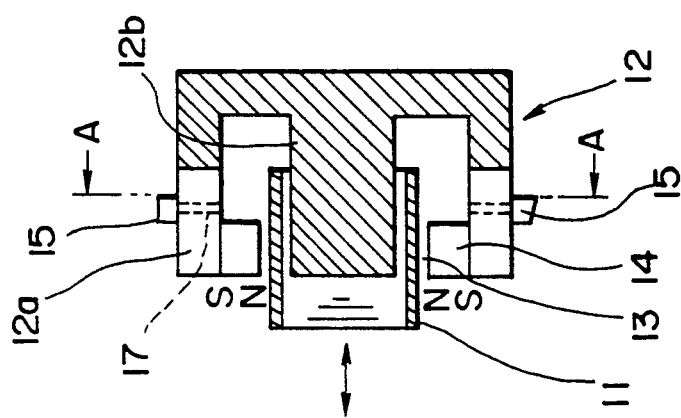
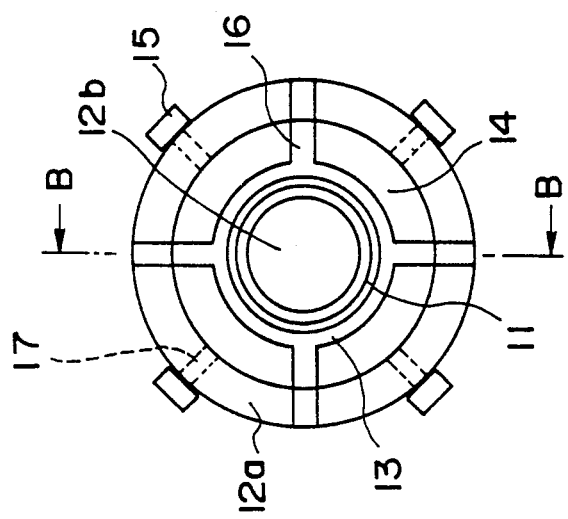

VOICE COIL MOTOR WITH DISCRETE FLUX PATHS

BACKGROUND OF THE INVENTION

1. Field of the Invention

The present invention relates to voice coil motors. More particularly, it relates to a voice coil motor for driving a movable magnetic head in a magnetic disk storage device, and an apparatus for measuring the center of the thrust of the voice coil motor.

2. Description of the Related Art

Heretofore, linear actuators have been extensively used. A typical example of a linear actuator is a voice coil motor.

The voice coil motor is operated on the same principle as a loudspeaker. It is mainly constructed of a voice coil, and a magnetic circuit which has a gap for inserting the voice coil therein and by which a magnetic flux traversing the voice coil is generated in the gap. In addition, the magnetic circuit is mainly configured of a permanent magnet and a yoke. With the voice coil motor, a thrust acting in the axial direction of the voice coil is developed in such a way that current flowing through the voice coil is changed according to the state in which the magnetic flux traverses this voice coil.

The voice coil motor plays an important role in the case where a magnetic head, a pickup or the like is positioned on a recording medium at high speed and with high accuracy in a magnetic disk storage device, an optical disk storage device, or the like.

The positioning is effected in such a way that a carriage on which the magnetic head, the pickup or the like is mounted is moved relative to the recording medium by the voice coil motor. Accordingly, the position of the center of gravity of the carriage and the center of the thrust developed by the voice coil motor needs to lie on an identical axis with the moving direction of the carriage. In a case where they do not lie on the identical axis, part of the thrust turns into a couple of forces, which incite the carriage. As a result, the carriage is vibrated to degrade the positioning accuracy of the magnetic head, the pickup or the like.

Therefore, various countermeasures as stated below have hitherto been taken.

In the official gazette of Japanese Patent Application Laid-open No. 211363/1983, there has been proposed a structure wherein a pair of voice coil motors are disposed at positions between which the carriage to be guided on a rail is centrally held.

Besides, the center of the resultant of the thrusts of the pair of voice coil motors is brought into agreement with the position of the center of gravity of the carriage. Thus, the couple which is one cause for the occurrence of the vibrations is prevented from acting on the carriage.

In addition, the official gazette of Japanese Patent Application Laid-open No. 10379/1988 has proposed a technique wherein the actuator is driven in the same manner as in the actual use of the voice coil motor and wherein the position of the center of gravity of the carriage or that of the center of the thrust of the voice coil motor is regulated so as to minimize vibrations occurring during the drive. As a practicable method, it proposed to form a hole in part of the yoke and to insert a rod of ferromagnetic substance into the hole, whereby the distribution of magnetic flux densities in the gap of the voice coil motor is adjusted to regulate the center of the thrust.

Further, the official gazette of Japanese Patent Application Laid-open No. 177854/1989 has proposed a technique wherein a chip of magnetic substance for adjusting the distribution of magnetic flux densities in the gap is stuck to part of the gap, thereby regulating the center of the driving force.

SUMMARY OF THE INVENTION

The inventors found that the prior-art techniques, however, have had problems as will be stated below:

Regarding the first technique disclosed in the official gazette of Japanese Patent Application Laid-open No. 211363/1983, since the plurality of voice coil motors are disposed for one carriage, inevitably the construction of a carriage driving system becomes complicated and unnecessarily large in size.

Further, it is not considered that, in each individual voice coil motor itself, the acting direction of the thrust to develop in the voice coil which is the actuator is conformed to the position of the center of gravity of a driven member which is connected to the voice coil. More specifically, in the conventional voice coil motor, it is difficult to control the magnetization of the magnet so as to uniformalize the magnetic flux within that gap of the magnetic path of the yoke into which the voice coil is inserted. As a result, the positions of the centers of gravity of the voice coil and the driven member do not conform to the direction of the thrust, so that the voice coil itself, etc. are inevitably vibrated.

As stated before, the second technique disclosed in the official gazette of Japanese Patent Application Laid-open No. 10379/1988 is so constructed that the rod of ferromagnetic substance is inserted into the hole formed in the yoke and that the magnetic flux distribution in the gap is adjusted in accordance with the extent of insertion of the rod. Accordingly, unless the rod is inserted to the extent of protruding beyond the inner peripheral surface of the yoke, the adjustment of the magnetic flux within the gap is not sufficiently effective. Therefore, the gap needs to be widened superfluously beforehand in correspondence with an adjusting margin by which the rod protrudes. This further incurs the problem that the thrust diminishes with the widening of the gap. Moreover, in the magnetic circuit of the inner magnet type in which the magnet is arranged in the gap, the rod stated above needs to be mounted on the outer periphery of the yoke, but the mounting is difficult in the points of actual installation and causes job inefficiency.

In the description of the official gazette, the voice coil motor is installed in a magnetic disk storage device by way of example, and the adjustment means is exemplified as minimizing the magnitude of that fluctuation of a read voltage which is ascribable to residual vibrations after a seek operation. In general, however, the dispersion of the central position of the thrust of the magnetic circuit is greater than that of the centroidal position of the driven side. In some cases, therefore, the central position of the thrust cannot be adjusted after the installation of the voice coil motor in the storage device.

It has accordingly been desirable to measure the central position of the thrust in the form of the yoke itself. Since, however, an ordinary gauss meter involves errors in the order of 2 [%], it is incapable of a measurement which satisfies the required accuracy of 0.5[%].

Further, the third technique disclosed in the official gazette of Japanese Patent Application Laid-open No. 177854/1989 consists of regulating the gap of the magnetic circuit. It is necessary to widen the gap superfluously beforehand in correspondence with a regulating margin. Likewise to the second prior-art technique, the third technique accordingly has the problem that the thrust diminishes on account of the regulating function.

An object of the present invention is to provide a voice coil motor in which, even when the central position of a thrust developing in a voice coil and the centroidal position of a driven member connected to the voice coil do not lie on an identical axis in the moving direction of the driven member, they can be brought onto the identical axis by moving the center of the thrust.

Another object is to provide an apparatus which detects the central position of the thrust of a voice coil motor.

In order to accomplish the first object, is one aspect of performance of the present invention, there is provided a voice coil motor having a voice coil, and a magnetic circuit which generates a magnetic flux traversing the voice coil; comprising the fact that said magnetic circuit has a plurality of magnetic paths traversing said voice coil and includes flux adjustment means for adjusting the magnetic fluxes of said magnetic paths, respectively.

Here, it is preferably that said magnetic circuit includes a yoke which has a plurality of magnetic paths and which is formed with hollows in correspondence with said magnetic paths, and that said flux adjustment means are members of magnetic substance which are respectively inserted into said hollows.

In another aspect of performance for accomplishing the second object, there is provided a thrust center measuring apparatus for detecting the center of a thrust developed in a voice coil motor which has a voice coil and a magnetic circuit; comprising support means for supporting one point of said voice coil; and couple detection means for detecting forces which act on any point other than said one point of said voice coil.

In one aspect of performance stated above, when the member of magnetic substance is inserted into the hollow formed in the yoke, the magnetic flux of the magnetic path inside the yoke corresponding to this hollow is changed. Then, the distribution of the magnetic fluxes traversing the voice coil is changed accordingly. As a result, the center of the thrust which develops in the voice coil is moved.

In the other aspect of performance, one point of the voice coil is supported by the support means. Besides, at that point of the voice coil which is other than the point supported by the support means, the forces exerted by the voice coil are measured by the couple detection means. Under this state, the thrust is developed in the voice coil. On this occasion, in a case where the center of the thrust acting on the voice coil lies on an axis which contains the point supported by the support means, the forces to be detected by the couple detection means are constant irrespective of whether or not the voice coil undergoes the thrust.

BRIEF DESCRIPTION OF THE DRAWINGS

FIG. 1A is a top view of a voice coil motor which is an embodiment of the present invention, FIG. 1B is a sectional view thereof taken along arrows B—B in FIG. 1A, and FIG. 1C is a sectional view thereof taken along arrows A—A in FIG. 1B;

DETAILED DESCRIPTION OF THE PREFERRED EMBODIMENTS

Figure 1D:
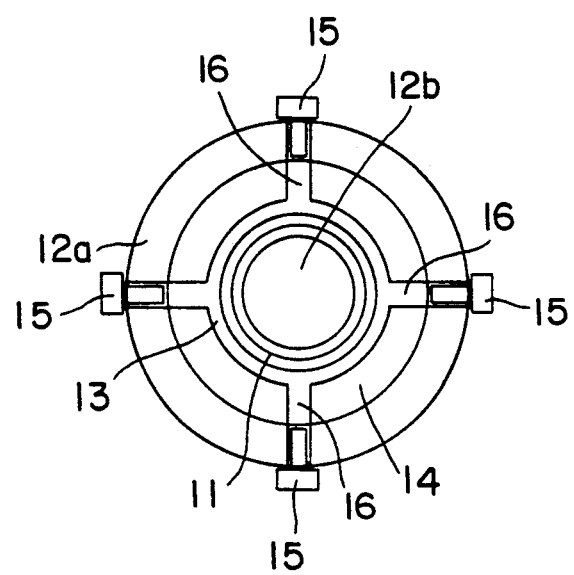
FIG. 1D is a top view of a second embodiment of a voice coil motor according to the present invention.

FIGS. 1A to 1C illustrate a voice coil motor which is an embodiment of the present invention. FIG. 1A is a top view of the embodiment, FIG. 1B is a sectional view thereof taken along arrows B—B in FIG. 1A, and FIG. 1C is a sectional view thereof taken along arrows A—A in FIG. 1B.

The basic construction of the voice coil motor is such that a gap 13 being a ring-shaped is defined at the upper part of a drum-shaped magnetic circuit which is configured of a yoke 12 and a permanent magnet 14, and that a cylindrical voice coil 11 is inserted in the gap 13.

As stated above, the magnetic circuit is configured of the yoke 12 and the permanent magnet 14.

The yoke 12 is made up of a columnar center yoke 12b, an outer yoke 12a which is located so as to surround the center yoke 12b in the shape of a ring, and a distal portion by which the yokes 12a and 12b are joined at the bottom parts thereof.

In addition, the permanent magnet 14 is mounted on the upper end part of the inner periphery of the outer yoke 12a.

The ring-shaped gap 13 intervenes between the permanent magnet 14 and the center yoke 12b, and a magnetic flux exists here.

Further, the outer yoke 12a in this embodiment is quadrisected by slits 16. Besides, rod holes 17 are formed in the respective quarters of the outer yoke 12a in such a manner as to connect the interior and the exterior of the voice coil motor. The rod holes 17 serve to insert adjuster rods 15 which will be detailed later. By regulating the level of insertion of the adjuster rods 15 into the corresponding rod holes 17, magnetic fluxes inside the respective divisional parts of the outer yoke 12a can be adjusted independently of one another. Incidentally, the number of the slits 16 and the shape and number of the rod holes 17 are not restricted to the above examples. Moreover, the rod holes 17 need not penetrate the outer yoke 12a, but they may well be mere recesses.

The permanent magnet 14 in this embodiment is quadrisected similarly to the outer yoke 12a.

The adjuster rods 15 are members of magnetic substance which are inserted into the corresponding rod holes 17, and which function to change the magnetic fluxes inside the corresponding quarters of the outer yoke 12a.

Incidentally, the permanent magnet 14 is made of an Nd-Fe-B alloy containing a rare-earth element, while the yoke 12 and the adjuster rods 15 are made of steel (standardized product S10C in JIS). These materials, however, are not restrictive.

The voice coil 11 is a cylindrical coil, which is inserted into the ring-shaped gap 13 in the direction of the center axis thereof. That is, the voice coil 11 is adapted to move so as to traverse the magnetic flux existing in the gap 13. Therefore, when current is caused to flow through the voice coil 11, a thrust is developed in the direction of a doubleheaded arrow indicated in FIG. 1B, and it moves the voice coil 11.

Figure 2:
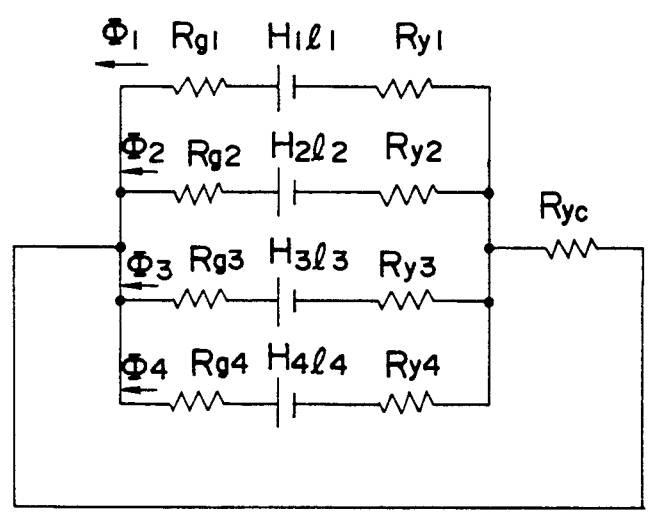
FIG. 2 is an equivalent circuit diagram of the voice coil motor shown in FIGS. 1A-1C.

FIG. 2 shows the equivalent circuit of the voice coil motor in FIGS. 1A–1C.

Referring to FIG. 2, symbols $\Phi_1$–$\Phi_4$ denote the magnetic fluxes corresponding to the respective divisions of the outer yoke 12a, symbols Rg1–Rg4 the magnetic reluctances of the respective divisions of the gap 13, symbols H1–H4 the intensities of coercive forces at the operating points of the respective divisions of the permanent magnet 14, symbols I1–I4 the thicknesses of the respective divisions of the permanent magnet 14, symbols Ry1–Ry4 the magnetic reluctances of the respective divisions of the outer yoke 12a, and symbol Ry the magnetic reluctance of the yoke 12 except those respectively Ry1–Ry4. As seen from FIG. 2, the magnetic circuit configured of the yoke 12 and the permanent magnet 14 has four magnetic paths.

In the voice coil motor of this embodiment, the magnetic flux in the gap 13 is broadly separated into the four magnetic fluxes $\Phi_1$–$\Phi_4$ in correspondence with the quadrisected outer yoke 12a.

Herein, the position of the center of the thrust varies depending upon the discrepancy among the magnetic fluxes $\Phi_1$–$\Phi_4$ in the four places. The first cause for the occurrence of discrepancy in the magnetic fluxes is the differences of the individual divisional parts of the permanent magnet 14. The differences of the individual parts of the permanent magnet 14 are, for example, individual differences in the orientation of a magnetic field, the magnitude of a density, and the state of magnetization. The second cause is the unequal thicknesses I1–I4 of the divisional parts of the permanent magnet 14. The third cause is the nonuniformity of the gap reluctances Rg1–Rg4 attributed to the unequal widths of the divisional parts of the gap 13 defined between the permanent magnet 14 and the yoke 12. Incidentally, in the absence of the adjuster rods 15, the reluctances Ry1–Ry4 of the divisional parts of the outer yoke 12a are hardly different.

When FIG. 2 is referred to, the function of the adjuster rods 15 is to adjust the magnetic reluctances Ry1–Ry4 of the respective quarters of the outer yoke 12a by changing, for example, the cross-sectional areas of the magnetic paths.

Next, the operation of the voice coil motor will be described.

In the state in which the voice coil 11 is inserted into the gap 13, current is caused to flow through this voice coil 11. Then, the thrust is developed in the voice coil 11 in accordance with the relation of the current to the magnetic flux existing in the gap 13, and the voice coil 11 is moved in the direction of the double-headed arrow indicated in FIG. 1B.

On this occasion, when the amount of insertion of the adjuster rod 15 into the rod hole 17 is altered, the magnetic flux within that quarter of the outer yoke 12a which corresponds to this adjuster rod 15 is changed. The change of the magnetic flux within the divisional part of the outer yoke 12a gives rise to a change in the magnetic flux in the part of the gap 13 corresponding to the outer yoke part. That is, a magnetic flux distribution in the gap 13 is indirectly adjusted by regulating the adjuster rod 15. Then, the center of the thrust to develop in the voice coil 11 is changed according to the change of the flux distribution in the gap 13. Thus, the central position of the thrust which develops in the voice coil 11 can be moved by regulating the four adjuster rods 15, respectively.

Herein, since the outer yoke 12a is divided, the magnetic fluxes within the respective divisions of the outer yoke 12a are adjusted independently of one another. It is accordingly not necessary to protrude the adjuster rod 15 beyond the inner peripheral surface of the outer yoke 12a and to directly change the magnetic flux within the gap 13 by means of the adjuster rod 15.

Incidentally, although in this embodiment, the position of the thrust is adjusted by altering the amounts of insertion of the adjuster rods 15 into the rod holes 17, it may well be adjusted by changing the adjuster rods 15 for ones made of materials of unequal magnetic reluctances.

Although, in this embodiment, the slits 16 are provided in four places, no special restriction is intended. By way of example, slits in two places will suffice for uniaxial adjustments. However, unless the outer yoke 12a is divided, the flux distribution within this outer yoke 12a is hardly changed even by the use of the adjuster rod 15, so that the outer yoke 12a needs to be divided into, at least, two parts.

Further, the provision of the single rod hole 17 in each divisional part of the outer yoke 12a is not restrictive, but a plurality of rod holes 17 may well be provided in each division of the outer yoke 12a. In this case, the adjustment width of the thrust position broadens owing to the increased number of rod holes 17.

Moreover, the provision of the rod holes 17 can be substituted by a construction illustrated in FIG. 1D in which the adjuster rods 15 are inserted into the slits 16. In this case, the magnetic fields of the divisional parts of the outer yoke 12a lying on both sides of the slit 16 into which the adjuster rod 15 is inserted are simultaneously adjusted.

As described above, in this embodiment, the central position of the thrust of the voice coil motor can be regulated. Besides, in the regulating job, the adjuster rod 15 is attracted to the yoke 12 by a magnetic attractive force, so that the job efficiency is good.

Next, a magnetic disk storage device in which the voice coil motor of the first embodiment stated above is adopted will be described as the second embodiment of the present invention.

Figure 3:
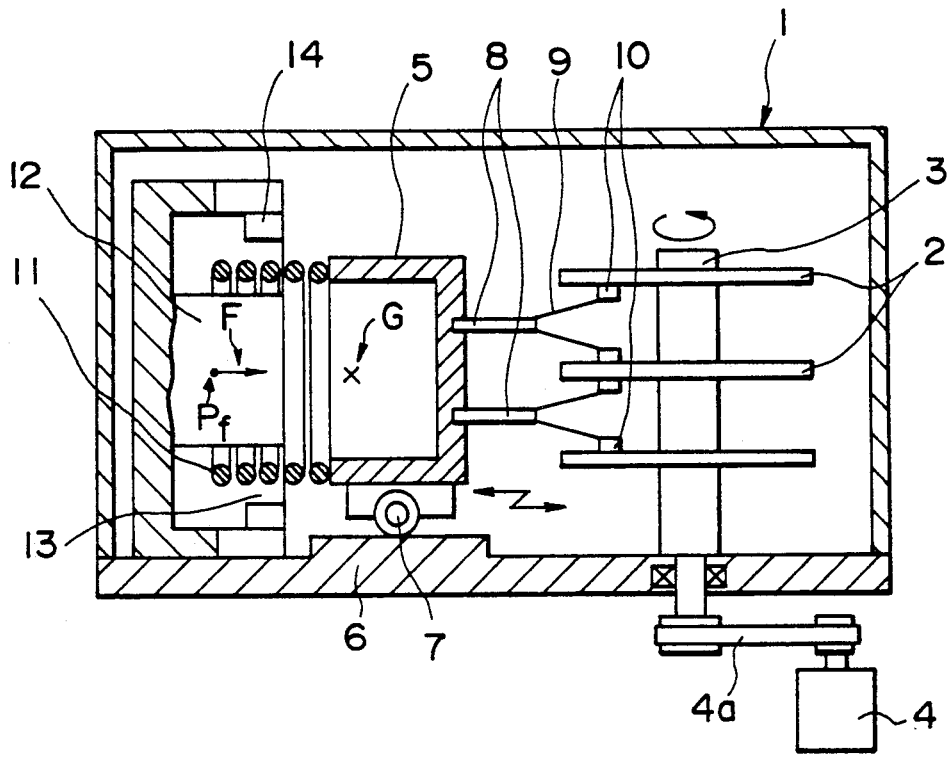
FIG. 3 is a schematic sectional view showing the essential portions of a magnetic disk storage in which the voice coil motor in FIGS. 1A-1C is built.

FIG. 3 is a schematic sectional view showing the essential portions of the magnetic disk storage device in which the voice coil motor embodying the present invention is built.

The illustrated magnetic disk storage device is mainly constructed of a housing 1, magnetic disks 2, magnetic heads 10, a carriage 5, and the voice coil motor which is configured of the voice coil 11, the permanent magnet 14, the yoke 12, etc.

Inside the sealed housing 1, a columnar spindle 3 is vertically erected, and the plurality of magnetic disks 2 are fixed to the spindle 3 in a manner so as to be coaxial and parallel to one another. Herein, the magnetic disks 2 are rotatable in substantially vertical attitudes about the spindle 3.

A driving motor 4 is mounted outside the housing 1. The spindle 3 (accordingly, the magnetic disks 2) is rotated at a desired speed by the driving motor 4 through a driving belt 4a which is extended between the spindle 3 and the output shaft of this driving motor 4.

The carriage 5 which is movable in the horizontal direction, namely, in the radial direction of each magnetic disk 2, is disposed by the side of the spindle 3. It is slidably guided by a bearing 7 which rolls relative to a rail 6 formed at the inner bottom surface of the housing 1.

On the side of the carriage 5 near to the spindle 3, a plurality of arms 8 are horizontally fixed in parallel with the planes of the corresponding magnetic disks 2. In addition, the distal ends of the arms 8 are located between the respectively adjacent magnetic disks 2.

Leaf springs 9 are fixed to the distal end of each of the arm 8 in a manner to bifurcate from this distal end. In turn, the magnetic head 10 is fixed to the distal end of each of the leaf springs 9 in an attitude confronting the surface of the magnetic disk 2.

The carriage 5 is moved in the horizontal direction along the rail 6 in such a way that the magnetic head 10 is positioned on any desired one of the concentric tracks formed on the magnetic disk 2. In this regard, the operations of writing and reading information onto and from the magnetic disk 2 are performed throughout the tracks.

Meanwhile, the voice coil motor of the first embodiment configured of the voice coil 11, the yoke 12, etc. is disposed on the side of the carriage 5 opposite to the side thereof having the arms 8 fixed thereto.

When current is conducted through the voice coil 11, a thrust F depending upon the sense and magnitude of the conduction current is developed in the voice coil 11 by the interaction of the current and the magnetic field which is established in the gap 13 between the permanent magnet 14 and the yoke 12. Then, the carriage 5 is driven by the thrust F.

In the construction stated above, the dispersion of the magnetic flux within the gap 13 among the individual units of the voice coil motors is inevitable due to the nonuniform magnetization of the permanent magnet 14, etc. Herein, in the state in which the center Pf of the thrust F and the center of gravity G of the carriage 5 do not lie on an identical axis in the moving direction of the carriage 5 on account of the dispersion of the magnetic flux, part of the thrust F turns into a couple of forces around the center of gravity G, and the couple undesirably vibrates the carriage 5.

In this embodiment, therefore, the vibrations of the carriage 5 are prevented by appropriately selecting the length and material(s) of the adjuster rods 15 so that, when the flux distribution in the gap 13 is indirectly adjusted by these adjuster rods 15, the center Pf and acting direction of the thrust F developing in the voice coil 11 may conform to the center of gravity G of the carriage 5.

Now, another embodiment will be described.

This embodiment is intended to detect the deviation of the center Pf of the thrust F of the voice coil motor which is to be used in the magnetic disk storage shown in FIG. 3.

It is to be understood, however, that the apparatus of this embodiment is not restricted to such a purpose or application. The construction of apparatus to be stated below is likewise not restrictive.

Figure 4:
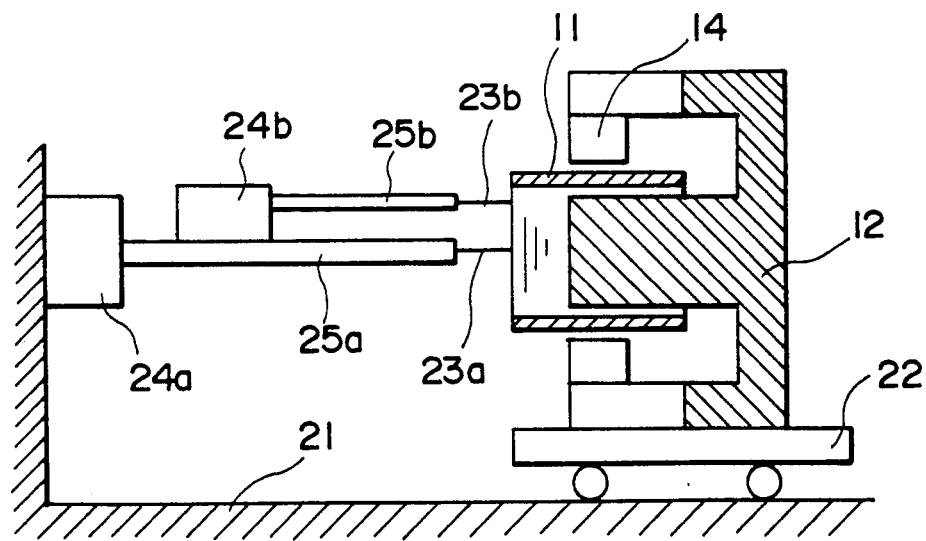
FIG. 4 shows another embodiment of the present invention and is a schematic sectional view of an apparatus for measuring the central position of the thrust of a voice coil motor.

FIG. 4 shows the construction of the apparatus which is the third embodiment.

This apparatus is mainly constructed of two load cells 24a, 24b, two connecting bars 25a, 25b, two leaf springs 23a, 23b, and a truck 22.

The load cells 24a, 24b can measure forces exerted thereon externally. Although strain gauges are employed in this embodiment, they are not restrictive.

The load cell 24a is connected, on one hand, with the voice coil 11 by the connecting bar 25a and the leaf spring 23a which are held horizontal. The position of the connection of the leaf spring 23a with the voice coil 11 lies on the axis which contains a position equivalent to the center of gravity G of the carriage 5 (indicated in FIG. 3), in a direction equivalent to the moving direction of the carriage 5. On the other hand, the left side surface of the load cell 24a is pressed against a wall or the like by that thrust of the voice coil 11 which is transmitted through the connecting bar 25a as well as the leaf spring 23a. In this way, the thrust which is developed by the magnetic circuit to-be-measured and the voice coil 11 is measured by the load cell 24a.

The load cell 24b is fixed on the connecting bar 25a. It is connected with the voice coil 11 through the connecting bar 25b and the leaf spring 23b which are held horizontal. Here, the position of the connection of the leaf spring 23b with the voice coil 11 and the position equivalent to the center of gravity G of the carriage 5 do not lie on the same axis in the direction equivalent to the moving direction of the carriage 5. Accordingly, the forces acting as the couple on the carriage 5, in the thrust which is developed by the magnetic circuit to-be-measured and the voice coil 11, are detected by the load cell 24b.

The magnetic circuit which is configured of the yoke 12 and the permanent 14, constitutes the voice coil motor. It is fixed on the truck 22, and is movable on a base 21 through this truck.

In operation, when the thrust is developed by causing current to flow through the voice coil 11, it is detected by the load cell 24a through the connecting bar 25a as well as the leaf spring 23a. In the meantime, the load cell 24b is horizontally moved the same distance as that of the connecting bar 25a because it is fixed on this connecting bar 25a herein. Accordingly, on condition that the center of the thrust lies on the axis containing the connected position of the leaf spring 23a, a force exhibited by the load cell 24b has no change compared with one in the case where no current is caused to flow through the voice coil 11.

Thus, the presence of the couple acting on the carriage 5 is detected by the discrepancy between the force exerted on the load cell 24b when the current is not caused to flow through the voice coil 11 and the force exerted thereon when the current is caused to flow.

Therefore, the couple is rendered null by regulating the center of the thrust so as to equalize the forces which act on the load cell 24b with and without the current flowing through the voice coil 11, respectively. Then, the center of the thrust conforms to the center of gravity G of the carriage 5.

Incidentally, the load cell 24a measures the thrust developing in the voice coil 11, and it is not directly required for the measurement of the couple. This load cell, however, makes it possible to measure that magnitude of a thrust which ordinarily indicates the performance of a voice coil motor.

As described above, with this embodiment, the position of the thrust center in the form of the magnetic circuit itself can be detected.

Accordingly, whether or not the position of the thrust center of the voice coil motor is adjustable can be decided before the magnetic disk storage is assembled. It is therefore possible to avoid the situation where the voice coil motor is found to be incapable of adjustment after having been built in.

In addition, if the dispersion of the centroidal position of the driven member, which is the carriage 5 in this embodiment, is small among the individual articles of the driven member, the thrust center of the voice coil motor can be adjusted so as to conform to the center of gravity of the driven member before the assembly of the magnetic disk storage. In this case, the magnetic flux distribution of the voice coil motor need not be adjusted in the assembling process of the magnetic disk storage.

Further, since dust is detrimental to the magnetic disk storage, the operations of sliding the components relative to each other need to be avoided to the utmost. The number of such operations can be decreased to enhance the reliability of the magnetic disk storage, in such a way that the above-stated operation of adjusting the flux distribution of the voice coil motor is performed before the assembly of the magnetic disk storage.

Moreover, the magnetic circuits in large numbers can be promptly measured merely by changing the magnetic circuit which is placed on the truck 22.

As set forth above, the present invention produces effects as exemplified below:

The central position of the thrust of a voice coil motor can be adjusted. This makes it possible to prevent the vibrations of a driven member attributed to the phenomenon that part of the thrust acts on the driven member as a couple of forces.

Further, the center of a thrust which develops in a voice coil motor can be detected with high accuracy.

What is claimed is:

1. A voice coil motor adapted to move a magnetic head above a recording medium, comprising
   a voice coil, and
   a magnetic circuit which generates a magnetic flux traversing said voice coil, said magnetic circuit including a permanent magnet and a yoke, said yoke being divided into a plurality of sections so as to form distinct magnetic paths, each of said sections having at least one hollow and a rod made from a magnetic material which is inserted into said hollow so as to adjust the magnetic flux of each of said distinct magnetic paths.

2. The voice coil motor of claim 1 wherein the rod associated with each of said sections comprises a different magnetic material thereby adjusting the magnetic flux of said distinct magnetic paths.

3. The voice coil motor of claim 1 wherein the rod associated with each of said sections is inserted to a different depth thereby adjusting the magnetic flux of said distinct magnetic paths.

4. The voice coil motor of claim 1 wherein said hollow is a hole, a recess, or a slit.

5. The voice coil motor of claim 1 wherein said yoke is divided into said plurality of sections by slits between said sections.

6. The voice coil motor of claim 1 wherein said yoke and each rod is made from steel.

7. The voice coil motor of claim 1 wherein said yoke comprises a center yoke portion and an outer yoke portion, said outer yoke portion being divided into said plurality of sections.

8. The voice coil motor of claim 7 wherein said permanent magnet is also divided into a plurality of sections associated with said different sections of said yoke.

9. A voice coil motor adapted to move a magnetic head above a recording medium, comprising
   a voice coil, and
   a magnetic circuit which generates a magnetic flux traversing said voice coil, said magnetic circuit including a yoke which is divided into a plurality of sections, a permanent magnet associated with each of said sections, and a member placed between any two of said sections which together with said yoke forms distinct magnetic paths.

10. A magnetic disk storage device wherein magnetic disks, magnetic heads, a carriage, and a voice coil motor are situated in a housing, said voice coil motor comprising a voice coil, and a magnetic circuit which generates a magnetic flux traversing the voice coil, said magnetic circuit having a plurality of magnetic paths traversing said voice coil and including flux adjustment means for adjusting magnetic fluxes of said magnetic paths, respectively, and a yoke which has a plurality of magnetic paths and which is formed with hollows in correspondence with said magnetic path; said flux adjustment means being members of magnetic substance which are respectively inserted into said hollows.

* * * * *